US009392523B1

(12) United States Patent \
Arestani et al.

(10) Patent No.: US 9,392,523 B1 \
(45) Date of Patent: Jul. 12, 2016

(54) ESTABLISHING AN ALTERNATE CALL PATH USING SHORT-RANGE WIRELESS TECHNOLOGY

(71) Applicant: Verizon Patent and Licensing Inc., Arlington, VA (US)

(72) Inventors: Aneeta F. Arestani, Edison, NJ (US); Sheela Thimmappa, Bridgewater, NJ (US); Yuk Lun Li, Morganville, NJ (US); Sidharth R. Sibal, Martinsville, NJ (US); Niloufer Adil Tamboly, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/675,226

(22) Filed: Mar. 31, 2015

(51) Int. Cl.
*H04W 40/02* (2009.01)
*H04W 4/00* (2009.01)

(52) U.S. Cl.
CPC .............. *H04W 40/02* (2013.01); *H04W 4/008* (2013.01)

(58) Field of Classification Search
CPC .............................. H04W 4/008; H04W 40/02
USPC ................................................ 455/41.2, 445
See application file for complete search history.

(56) References Cited

U.S. PATENT DOCUMENTS

| | | | |
|---|---|---|---|
| 2006/0189337 A1* | 8/2006 | Farrill ..................... | H04W 4/10 455/416 |
| 2008/0056472 A1* | 3/2008 | Tanemura ......... | H04M 3/42374 379/201.01 |
| 2010/0248706 A1* | 9/2010 | Potkonjak ......... | H04M 1/72569 455/419 |
| 2011/0222675 A1* | 9/2011 | Chua ...................... | H04L 12/66 379/93.01 |
| 2013/0244633 A1* | 9/2013 | Jacobs .................. | H04W 68/00 455/415 |

* cited by examiner

*Primary Examiner* — Marisol Figueroa

(57) ABSTRACT

A device may establish a first communication with a first communication device using short-range wireless communication technology. The device may establish a second communication with a second communication device using short-range wireless communication technology. The device may receive a voice call from the second communication device. The device may determine call information associated with the voice call. The device may compare the call information with stored call information. The device may associate a path condition, previously associated with the stored call information, with the voice call if the call information matches the stored call information. The device may selectively establish a call path to a speaker associated with the device or to the first communication device based on the path condition.

20 Claims, 10 Drawing Sheets

ESTABLISHING AN ALTERNATE CALL PATH USING SHORT-RANGE WIRELESS TECHNOLOGY

BACKGROUND

Short-range wireless communication enables certain devices (e.g., smartphones, personal digital assistants, wearables, etc.) to establish radio communication with each other by bringing the devices into proximity. Short-range wireless communication devices are a secure, low power, and inexpensive way of connecting and exchanging information between the devices without the need for wires or cables to link the devices together.

DETAILED DESCRIPTION OF PREFERRED EMBODIMENTS

Figure 1A:
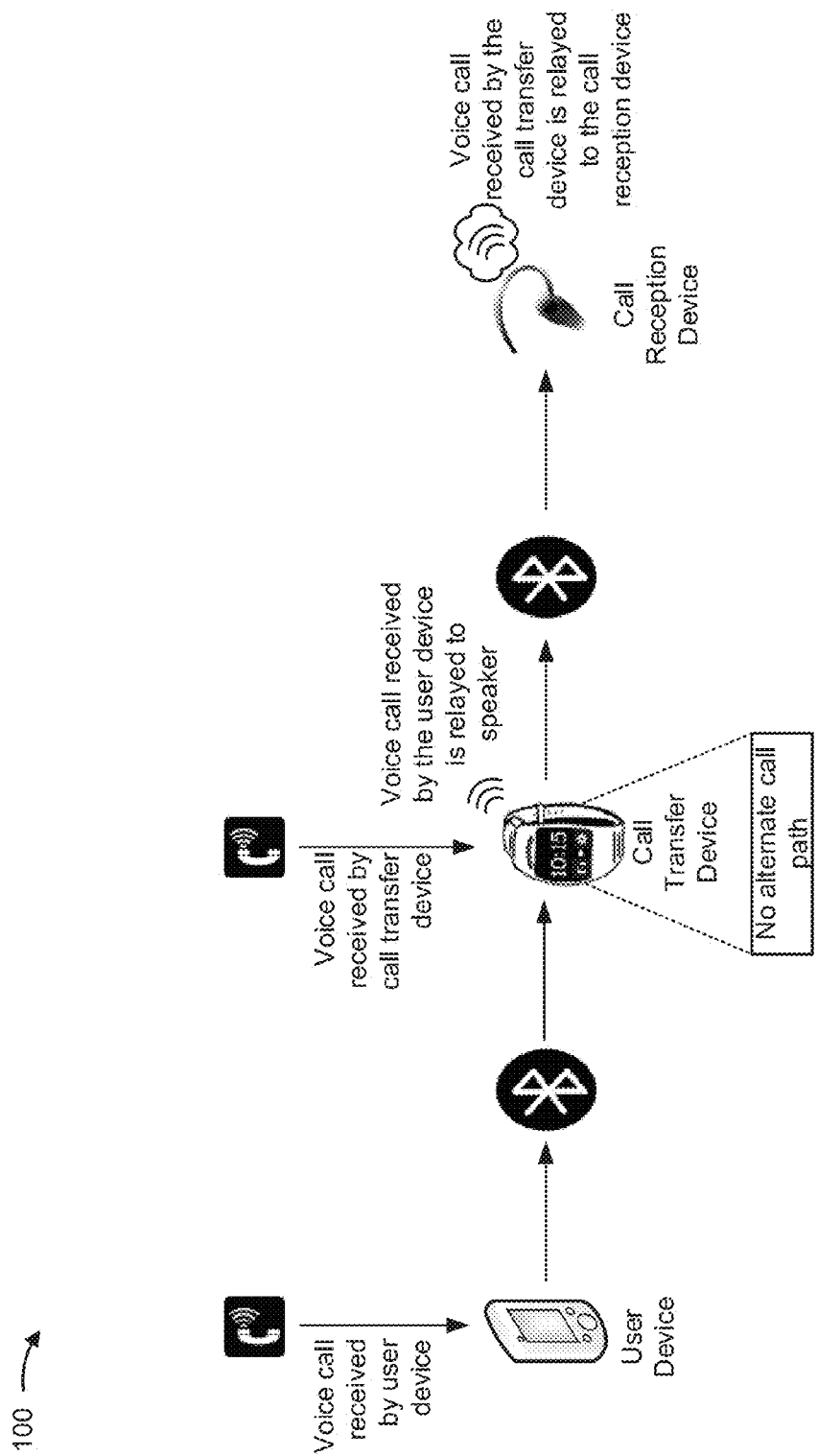
FIGS. 1A and 1B are diagrams of an overview of an example implementation described herein.

The following detailed description of example implementations refers to the accompanying drawings. The same reference numbers in different drawings may identify the same or similar elements.

Wireless communication is fast becoming ubiquitous. New features and capabilities are being developed constantly to satisfy many modern users and their on-the-go, multi-tasking lifestyles. Short-range wireless communication technology (e.g., Bluetooth wireless technology) allows devices to communicate wirelessly and share data. For example, a user may utilize short-range wireless communication technology to receive a voice call on a user device (e.g., a mobile device) and forward the voice call to a headset (e.g., a Bluetooth headset) that the user is wearing, allowing the user to receive the voice call in a public place, keep the user's hands free during the voice call, and maintain privacy.

Other short-range wireless communication devices include wearable devices. Wearable devices (e.g., smartwatches, smart eyewear, etc.) are clothing and/or accessories, incorporating computer and advanced electronic technologies for wireless communication. Wearable devices may include a modem, allowing the wearable devices to send and/or receive voice calls, short message service (SMS), e-mails, or the like. Wearable devices allow two or more devices to be connected together wirelessly, with the wearable devices acting as proxies between the two or more devices.

For example, a user may use a headset, connected to a wearable device, which in turn is connected to a user device. The user may receive a voice call on either the user device or the wearable device. With rapid development in short-range wireless communication technology, the user may naturally expect for both connections (i.e., a connection between the headset and the wearable device and a connection between the user device and the wearable device) to provide a user experience of a same function and quality. The user experience, however, may be compromised because the wearable device can maintain call privacy only if the voice call is received by the wearable device. In such cases, a call path may be established, relaying packets associated with the voice call from the wearable device to the headset. If the voice call is received by the user device and forwarded to the wearable device, the wearable device is not capable of establishing the call path to the headset. Instead, the packets, associated with the voice call, are relayed to a speaker, included in the wearable device. As a result, privacy for the voice call is no longer maintained.

Implementations described herein provide establishing an alternate call path, for a call transfer device, using short-range wireless technology. The call transfer device may use a bi-directional buffer to establish an alternate call path to relay packets, associated with a voice call, to a call reception device, irrespective of whether the voice call was received at the call transfer device or a user device and forwarded to the call transfer device, enabling privacy and mobility for a user.

Figure 1B:
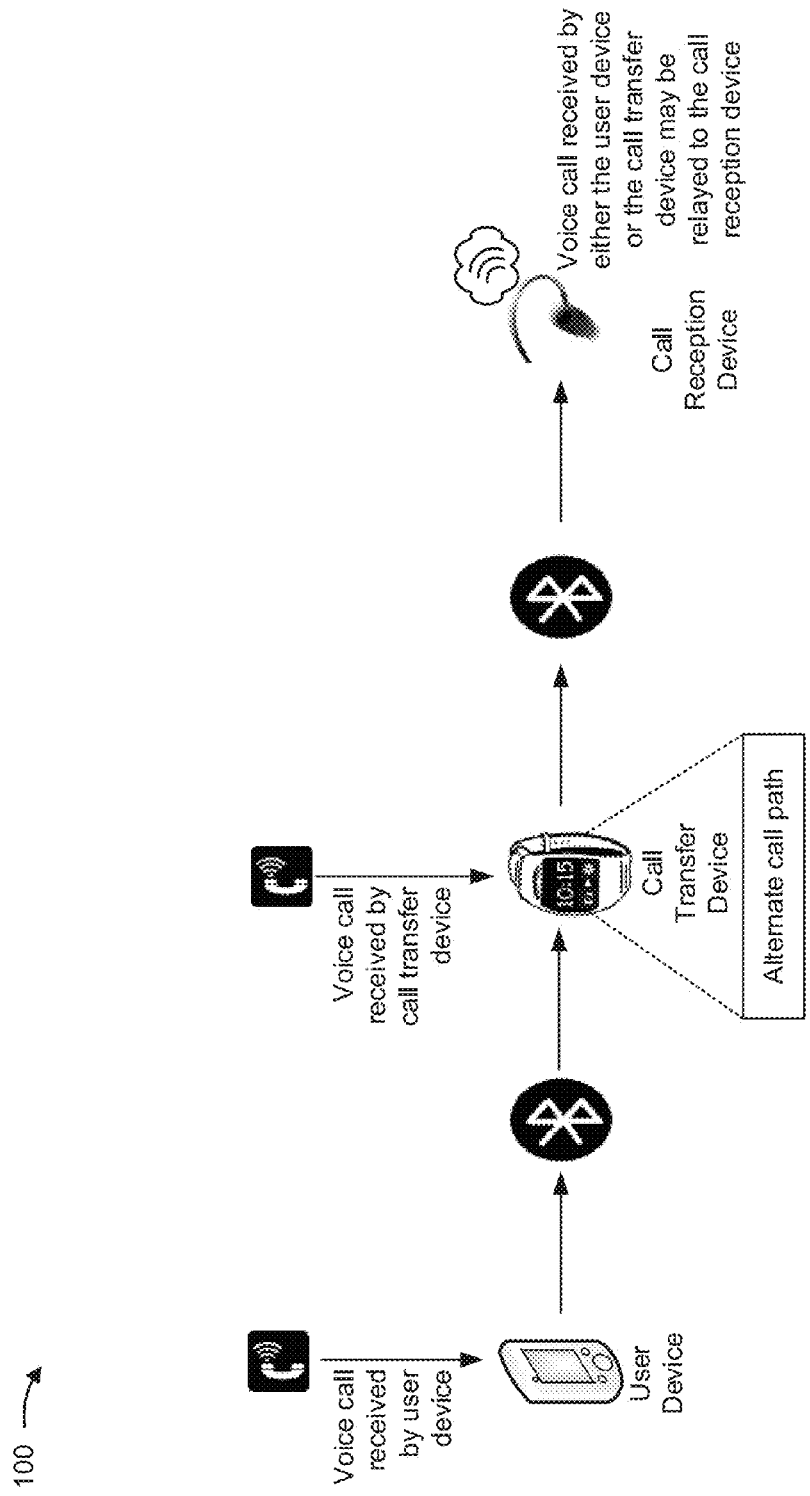

FIGS. 1A and 1B are diagrams of an overview of an example implementation 100 described herein. As shown in FIG. 1A, assume a user device (e.g., a mobile phone) is connected, using short-range wireless communication technology (e.g., Bluetooth technology), to a wearable call transfer device (e.g., a smartwatch). Assume that the call transfer device is further connected, using Bluetooth technology, to a call reception device (e.g. a Bluetooth headset). Assume that the call transfer device has a modem and voice calls may be received either by the user device and then forwarded to the call transfer device or by the call transfer device. As shown in FIG. 1A, without an alternate call path included in the call transfer device, packets associated with the voice calls received by the user device, may be relayed only to a speaker, included in the call transfer device, thereby preventing privacy for the voice call. As shown in FIG. 1A, only voice calls received directly by the call transfer device may be relayed to the call reception device. In such a situation, if privacy were important for a voice call received at the user device, the user may stop an activity to answer the voice call utilizing the user device.

As shown in FIG. 1B, assume the user device is connected, using Bluetooth technology, to the call transfer device. Assume that the call transfer device is further connected, using Bluetooth technology, to the call reception device. Assume that the call transfer device has the modem and voice calls may be received either by the user device and then forwarded to the call transfer device or by the call transfer device. As shown in FIG. 1B, assume the call transfer device includes a bi-directional buffer to establish an alternate call path to relay packets, associated with a voice call, to a call reception device. As shown in FIG. 1B, packets, associated with the voice calls received by the user device, may be relayed to the call reception device and/or the speaker, included in the call transfer device, thereby allowing for privacy for the voice call. As shown in FIG. 1B, voice calls received directly by the call transfer device may also be relayed to the call reception device.

While the description to follow will focus on utilizing Bluetooth technology, the description may also apply to other types of short-range wireless communication technology, such Z-Ware technology, ZigBee technology, Body Area Network technology, or another short-range wireless communication technology.

Figure 2:
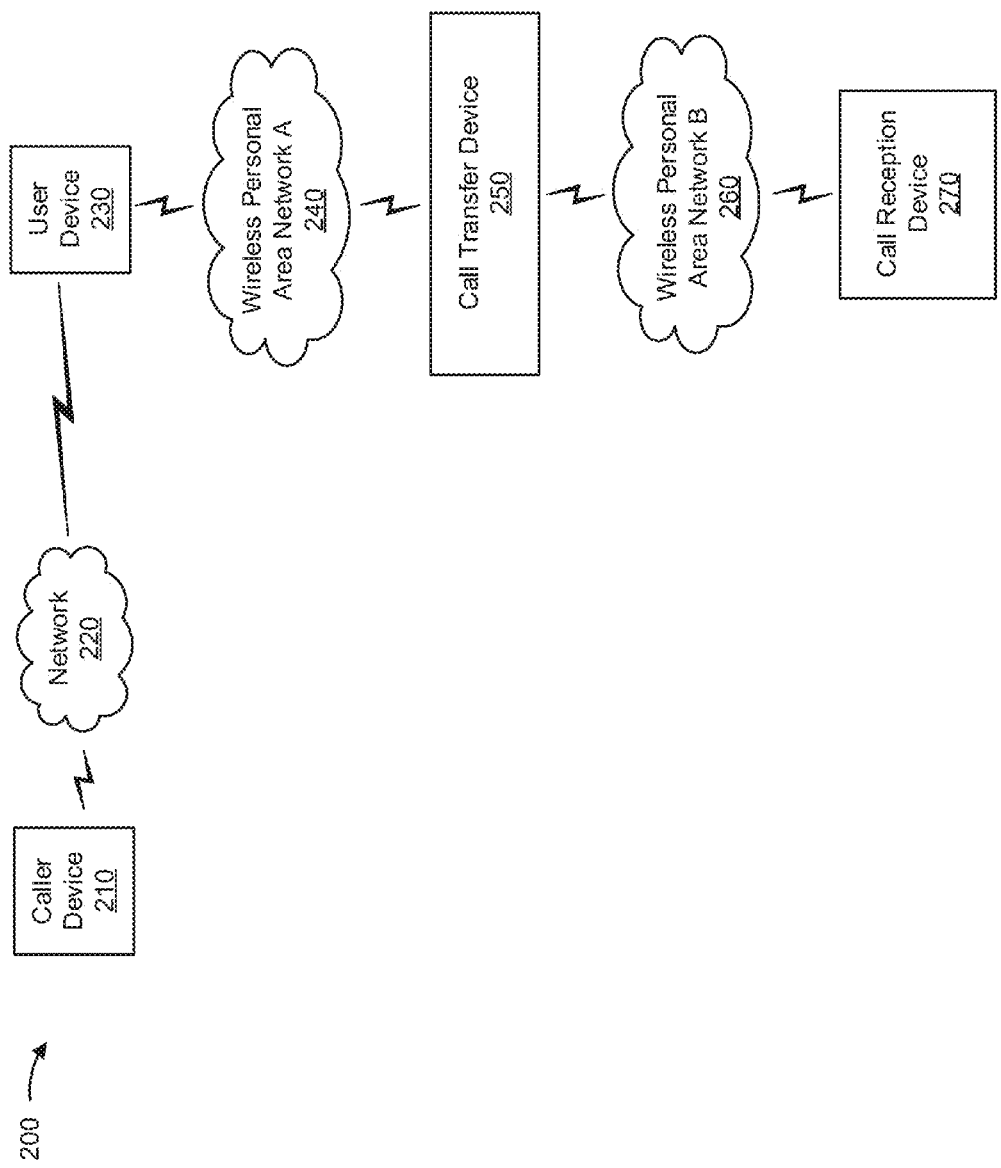
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a caller device 210, a network 220, a user device 230, a wireless personal area network A (WPAN-A) 240, a call transfer device 250, a wireless personal area network B (WPAN-B) 260, and a call reception device 270. Devices of environment 200 may interconnect via wired connections, wireless connections, or a combination of wired and wireless connections.

Caller device 210 may include a device capable of providing, presenting, and/or displaying information. For example, caller device 210 may include a mobile phone (e.g., a smart phone, a radiotelephone, etc.), a computing device (e.g., a desktop computer, a laptop computer, a tablet computer, a handheld computer, etc.), or a similar device. In some implementations, caller device 210 may include a communication interface that allows caller device 210 to receive information from and/or transmit information to network 220 and/or another device.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

User device 230 (sometimes referred to as a "first communication device") may include one or more devices capable of communicating with a network (e.g., network 220). For example, user device 230 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 230 may include wireless personal area network technology (e.g., Bluetooth technology, Z-Ware technology, ZigBee technology, Body Area Network technology, etc.), enabling short-range wireless communication. User device 230 may send traffic to and/or receive traffic from caller device 210, network 220, WPAN-A 240, call transfer device 250, wireless personal area network B (WPAN-B) 260, call reception device 270, and/or another device. User device 230 may include a modem for receiving and/or placing voice calls.

WPAN-A 240 may include one or more wireless communications networks, interconnecting devices (e.g., user device 230, call transfer device 250, call reception device 270, another wireless communication device (not shown), etc.) within a relatively small area (e.g., approximately 1 to 10 meters) and using wireless personal area network technology (e.g., Bluetooth technology, Z-Ware technology, ZigBee technology, Body Area Network technology, etc.), enabling short-range wireless communication.

Call transfer device 250 may include one or more devices capable of receiving, generating, storing, processing, and/or providing information. For example, call transfer device 250 may include a communication and/or computing device, such as a wearable communication device (e.g., a smart wristwatch, a pair of smart eyeglasses, etc.) or a similar type of device, using wireless personal area network technology (e.g., Bluetooth technology, Z-Ware technology, ZigBee technology, Body Area Network technology, etc.), enabling short-range wireless communication.

In some implementations, call transfer device 250 may receive information from and/or transmit information to caller device 210, network 220, WPAN-A 240, WPAN-B 260, call reception device 270, and/or another device. Call transfer device 250 may include a modem for receiving and/or placing voice calls. Call transfer device 250 may include a buffer to adjust for delays in sending and/or receiving the packets for the voice calls, based on synchronization issues of call data, included in the packets, between user device 230, call reception device 250, and/or another device.

WPAN-B 260 may include one or more wireless communications networks, interconnecting devices (e.g., call transfer device 250, call reception device 270, another wireless communication device (not shown), etc.) within a relatively small area (e.g., approximately 1 to 10 meters) and using wireless personal area network technology (e.g., Bluetooth technology, Z-Ware technology, ZigBee technology, Body Area Network technology, etc.), enabling short-range wireless communication.

Call reception device 270 (sometimes referred to as a "second communication device") may include one or more devices capable receiving, generating, storing, processing, and/or providing information. For example, call reception device 270 may include a personal listening device, such as a headset or headphones, configured to facilitate personal listening of voice calls received by user device 230, call transfer device 250, and/or another device. Call reception device 270 may include a sound conversion device (e.g., a microphone) for receiving, amplifying, transmitting, and/or recording call data. Call reception device 270 may include wireless personal area network technology (e.g., Bluetooth technology, Z-Ware technology, ZigBee technology, Body Area Network technology, etc.), enabling short-range wireless communication. In some implementations, call reception device 270 may receive information from and/or transmit information to user device 230, WPAN-A 240, call transfer device 250, WPAN-B 260, and/or another device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
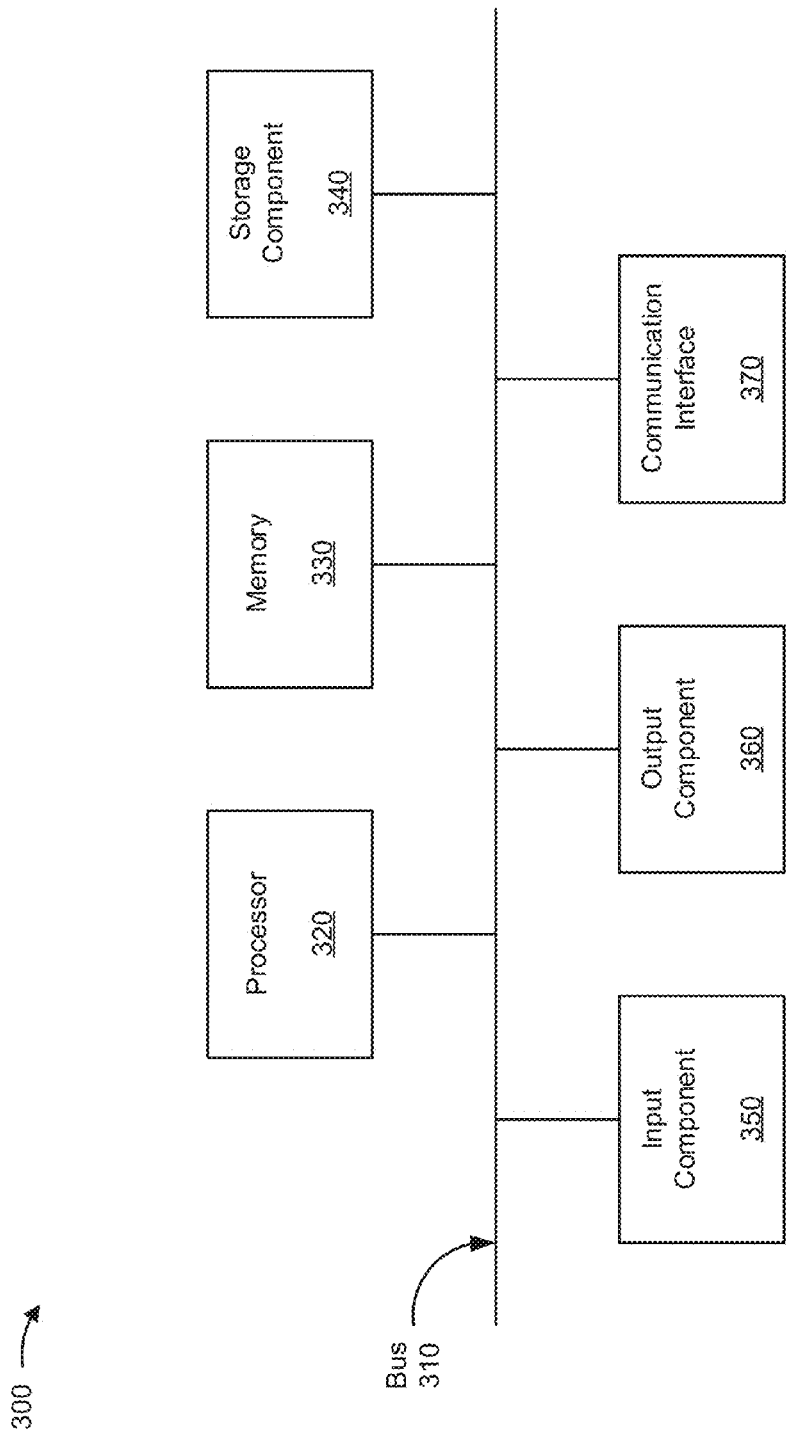
FIG. 3 is a diagram of example components of one or more devices of FIG. 2.

FIG. 3 is a diagram of example components of a device 300. Device 300 may correspond to caller device 210, user device 230, call transfer device 250, and/or call reception device 270. In some implementations, caller device 210, user device 230, call transfer device 250, and/or call reception device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
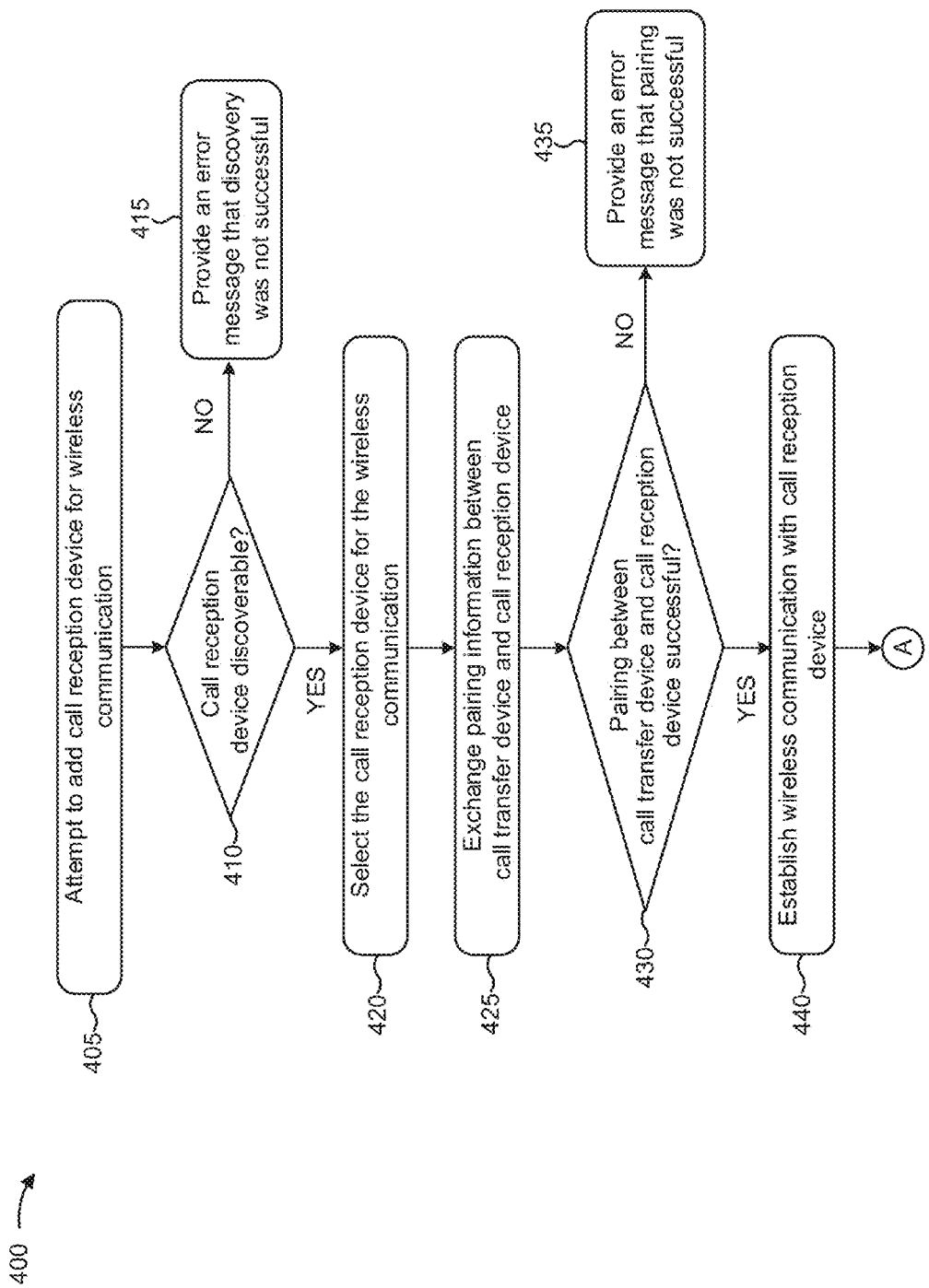
FIGS. 4A-4B are flow charts of an example process for establishing an alternate call path using short-range wireless technology.
Figure 4B:
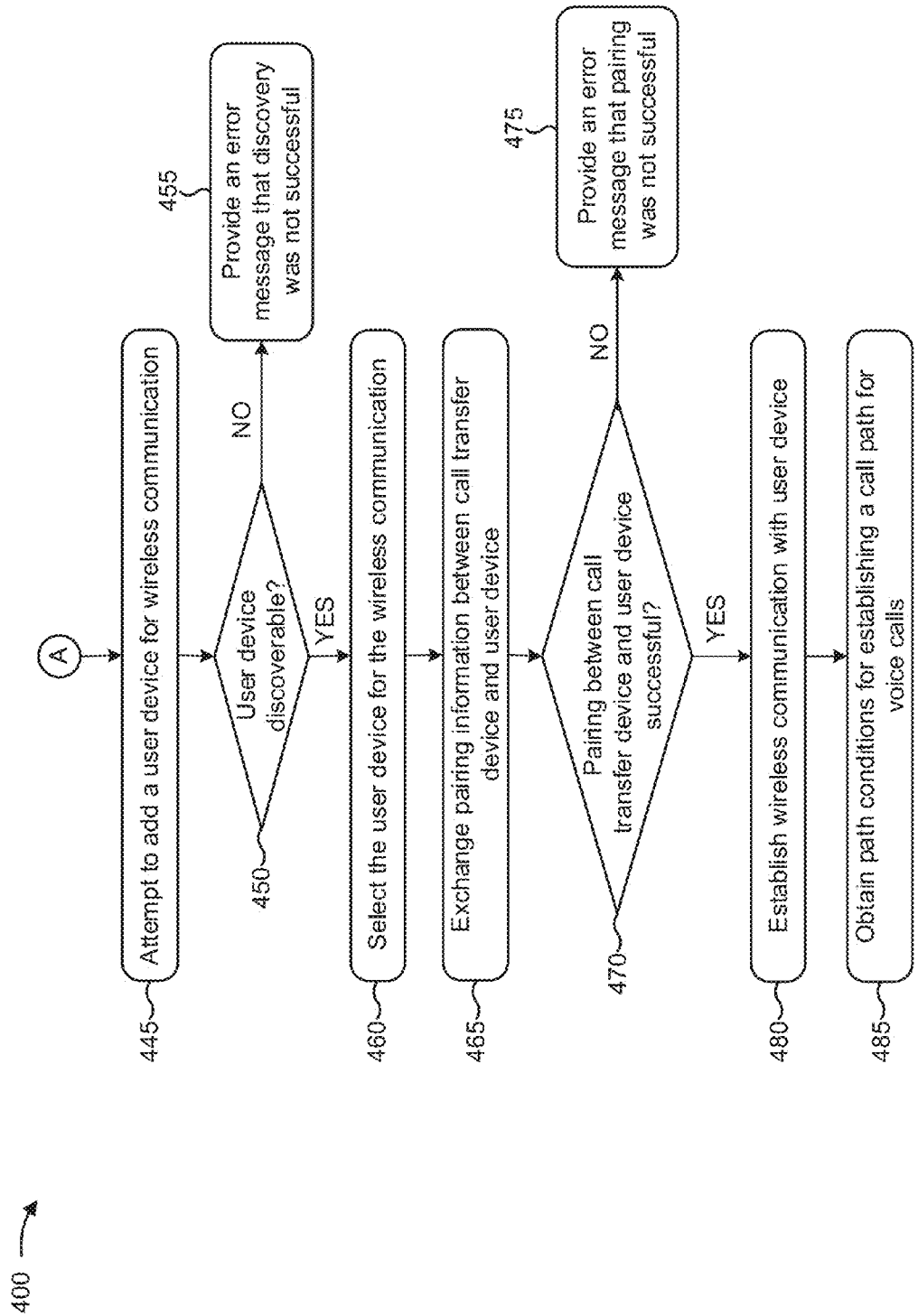

FIGS. 4A-4B are flow charts of an example process 400 for establishing an alternate call path using short-range wireless technology. In some implementations, one or more process blocks of FIGS. 4A-4B may be performed by call transfer device 250. In some implementations, one or more process blocks of FIGS. 4A-4B may be performed by another device or a set of devices separate from or including call transfer device 250, such as user device 230 and/or call reception device 270.

As shown in FIG. 4A, process 400 may include attempting to add a call reception device for wireless communication (block 405). For example, call transfer device 250 may receive a request to utilize (or "add") call reception device 270 (as a second communication device) using Bluetooth technology. In some implementations, call transfer device 250 may be configured to automatically add call reception device 270 for the wireless communication (e.g., call transfer device 250 may be configured to receive the request when call transfer device 250 and/or call reception device 270 is powered on). In some implementations, a user of call transfer device 250 may select an option using an input mechanism provided on a user interface of call transfer device 250 to add call reception device 270.

As shown in FIG. 4A, process 400 may include determining whether the call reception device is discoverable (block 410). For example, call transfer device 250 may send an inquiry request (via WPAN-B 260 and/or another network) to call reception device 270 within a range (e.g., 1 meter, 5 meters, 10 meters, etc.) in response to receiving a request to add one or more devices for the wireless communications.

Additionally, or alternatively, call transfer device 250 may receive device information (e.g., a device name, a device network address, clock information for a device, frequency information for a device, etc.) for call reception device 270 that received the inquiry request and are within the range (e.g., devices within the range that are powered on and set in a mode for discovery). If the device information for call reception device 270 is received by call transfer device 250, then call transfer device 250 may determine that call reception device 270 sending the device information is discoverable. If the device information for call reception device 270 is not received by call transfer device 250, then call transfer device 250 may determine that call reception device 270 is not discoverable.

As further shown in FIG. 4A, if the call reception device is not discoverable (block 410—No), then process 400 may include providing an error message that discovery was not successful (block 415). For example, if call transfer device 250 does not receive the device information for call reception device 270, call transfer device 250 may provide an error message indicating that there are no discoverable devices. Additionally, or alternatively, call transfer device 250 may provide the error message for display (or output via a speaker) so that a user of call reception device 250 may understand why one or more devices are not connected for the wireless communication.

As further shown in FIG. 4A, if the call reception device 270 is discoverable (block 410—Yes), then process 400 may include selecting the call reception device for the wireless communication (block 420). For example, call transfer device 250 may select call reception device 270 for the wireless communication based on the device information for call reception device 270. In some implementations, call transfer device 250 may automatically select call reception device 270 (e.g., by selecting a device with which call transfer device 250 previously connected, by selecting a device with which call transfer device 250 previously bonded, by selecting a device closest in proximity to call transfer device 250, etc.). In some implementations, the user of call transfer device 250 may select call reception device 270 from a list of devices provided on the user interface of call transfer device 250 based on the device information. Additionally, or alternatively, call transfer device 250 may synchronize a frequency and a clock value of call transfer device 250 with a frequency and a clock value of call reception device 270, establishing a link between call transfer device 250 and call reception device 270.

As further shown in FIG. 4, process 400 may include exchanging pairing information between the call transfer device and the call reception device (block 425). For example, call transfer device 250 may be permitted access to the wireless communication if call transfer device 250 is determined to be an authorized device by using a security mechanism (e.g., pairing) by call reception device 270. Pairing is done with an encryption key, such as a "PIN," which stands for Personal Information Number (e.g., 0000, 1234, 56789, 000000, etc.).

Call transfer device 250 may receive a PIN-pairing request from call reception device 270. Call transfer device 250 may provide a PIN to call reception device 270 in response to the PIN-pairing request. In some implementations, call transfer device 250 may provide the PIN automatically in response to the PIN-pairing request. In some implementations, a user of call transfer device 250 may input the PIN using the input mechanism provided on the user interface of call transfer device 250, in response to the PIN-pairing request. In some implementations, the PIN may be provided in an encrypted mode, using a second encryption key, in order to prevent a signal for the wireless communication from being compromised.

As further shown in FIG. 4A process 400 may include determining whether pairing was successful between the call transfer device and the call reception device (block 430). For example, call transfer device 250 may receive a notification that call reception device 270 compared the PIN provided by call transfer device 250 with a stored PIN for call reception device 270. If the PIN provided by call transfer device 250 matches the stored PIN for call reception device 270, then the pairing is successful. If the PIN provided by call transfer device 250 does not match the stored PIN for call reception device 270, then the pairing is not successful.

As further shown in FIG. 4A, if the pairing is not successful (block 430—No), process 400 may include providing an error message that pairing was not successful (block 435). For example, call transfer device 250 may provide an error message indicating that pairing was not successful. Additionally, or alternatively, call transfer device 250 may provide the error message for display (or for output via a speaker) so that a user of call transfer device 250 may understand why one or more devices are not connected for the wireless communication. In some implementations, call transfer device 250 may specify the one or more devices that failed to pair. In some implementations, call transfer device 250 may receive a notification to submit a new PIN.

As further shown in FIG. 4A, if the pairing is successful (block 430—Yes), process 400 may include establishing wireless communication with the call reception device (block 440). For example, call transfer device 250 may establish wireless communication after determining that pairing between call transfer device 250 and call reception device 270 was successful, thereby allowing communication between call transfer device 250 and call reception device 270. In some implementations, call transfer device 250 may receive a notification (e.g., a message on a user interface of call transfer device 250, an audible alert, etc.) that the pairing was successful. In some implementations, call transfer device 250 may bond with call reception device 270. Bonding is a process that occurs after pairing where the pair of keys exchanged is stored for later use.

Additionally, or alternatively, call transfer device 250 may receive control data or a feature set (e.g., identification information, bandwidth information, noise cancelling parameters, call profile information, etc.) for call reception device 270. Additionally, or alternatively, call transfer device 250 may assume the feature set for call reception device 270. Call transfer device 250 may present the feature set assumed from call reception device 270 when connecting and/or communicating wirelessly with user device 230 and/or another device.

Additionally, or alternatively, call transfer device 250 may receive wireless communication protocol information (e.g., Bluetooth protocols such as Logical Link Control and Adaption Protocol or L2CAP, radio frequency communication, RFCOMM, or the like) from call transfer device 270. Additionally, or alternatively, call transfer device 250 may utilize the wireless communication protocol information when connecting and/or communicating wirelessly with user device 230 and/or another device.

Additionally, or alternatively, call transfer device 250 may search for services (e.g., files, contact details, calendar appointments, etc.), provided by call reception device 270, using a search-related protocol (e.g., Service Discovery Protocol or SDP). Additionally, or alternatively, call transfer device 250 may create a communication channel using the wireless communication protocol for sending and/or receiving data, with call reception device 270, during the wireless communication.

As shown in FIG. 4B, process 400 may include attempting to add a user device for wireless communication (block 445). For example, call transfer device 250 may receive a request to add user device 230 (as a first communication device) for the wireless communication using Bluetooth technology. For example, call transfer device 250 may be configured to automatically add user device 230 for the wireless communication (e.g., call transfer device 250 may be configured to receive the request when call transfer device 250 and/or user device 230 is powered on). In some implementations, a user of call transfer device 250 may select an option using the input mechanism provided on the user interface of call transfer device 250 to add user device 230 for the wireless communication.

As shown in FIG. 4B, process 400 may include determining whether the user device is discoverable (block 450). For example, call transfer device 250 may send an inquiry request (via WPAN-A 240 and/or another network) to user device 230 within a range (e.g., 1 meter, 5 meters, 10 meters, etc.) in response to receiving a request to add user device 230 for the wireless communications.

Additionally, or alternatively, call transfer device 250 may receive device information (e.g., a device name, a device network address, clock information for a device, frequency information for a device, etc.) for user device 230 that received the inquiry request and that is within the range (e.g., devices within the range that are powered on and set in a mode for discovery). If the device information for user device 230 is received by call transfer device 250, then call transfer device 250 may determine that user device 230 sending the device information is discoverable. If the device information for user device 230 is not received by call transfer device 250, then call transfer device 250 may determine that user device 230 is not discoverable.

As further shown in FIG. 4B, the user device is not discoverable (block 450—No), then process 400 may include providing an error message that discovery was not successful (block 455). For example, if call transfer device 250 does not receive the device information for user device 230, call transfer device 250 may provide an error message indicating that there are no discoverable devices. Additionally, or alternatively, call transfer device 250 may provide the error message for display (or for output via a speaker) so that a user of call transfer device 250 may understand why user device 230 is not connected for the wireless communication.

As further shown in FIG. 4B, if the user device is discoverable (block 450—Yes), then process 400 may include selecting the user device for the wireless communication (block 460). For example, call transfer device 250 may select user device 230 for the wireless communication based on the device information for user device 230. In some implementations, call transfer device 250 may automatically select user device 230 (e.g., by selecting a device with which call transfer device 250 previously connected, by selecting a device with which call transfer device 250 previously bonded, by selecting a device closest in proximity to call transfer device 250, etc.). In some implementations, a user of call transfer device 250 may select user device 230 from a list of devices using the input mechanism provided on the user interface of call transfer device 250.

Additionally, or alternatively, call transfer device 250 may synchronize a frequency and a clock value of call transfer device 250 with a frequency and a clock value of user device 230, establishing a link between call transfer device 250 and user device 230. Additionally, or alternatively, call transfer device 250 may present the feature set, received from call reception device 270, to user device 230. Additionally, or alternatively, call transfer device 250 may utilize the wireless communication protocol information, received from call reception device 270, when connecting and/or communicating wirelessly with user device 230.

As further shown in FIG. 4B, process 400 may include exchanging pairing information between the call transfer device and the user device (block 465). For example, call transfer device 250 may be permitted access to the wireless communication if call transfer device 250 is determined to be an authorized device by using a security mechanism (e.g., pairing) by user device 230.

For example, call transfer device 250 may receive a PIN-pairing request from user device 230. Call transfer device 250 may provide a PIN to user device 230, in response to the PIN-pairing request. In some implementations, call transfer device 250 may provide the PIN automatically in response to the PIN-pairing request. In some implementations, a user of call transfer device 250 may input the PIN using the input mechanism provided on the user interface of call transfer device 250, in response to the PIN-pairing request. In some implementations, the PIN may be provided in an encrypted mode, using a second encryption key, in order to prevent a signal for the wireless communication from being compromised.

As further shown in FIG. 4B, process 400 may include determining whether pairing was successful between the call transfer device and the user device (block 470). For example, call transfer device 250 may receive a notification that user device 230 compared the PIN provided by call transfer device 250 with a stored PIN for user device 230. If the PIN provided by call transfer device 250 matches the stored PIN for user device 230, then the pairing is successful. If the PIN provided by call transfer device 250 does not match the stored PIN for user device 230, then the pairing is not successful.

As further shown in FIG. 4B, if the pairing is not successful (block 470—No), process 400 may include providing an error message that pairing was not successful (block 475). For example, call transfer device 250 may provide an error message indicating that pairing was not successful. Additionally, or alternatively, call transfer device 250 may provide the error message for display (or for output via a speaker) so that a user of call transfer device 250 may understand why one or more devices are not connected for the wireless communication. In some implementations, call transfer device 250 may specify the one or more devices that failed to pair. In some implementations, call transfer device 250 may receive a notification to submit a new PIN.

As further shown in FIG. 4B, if the pairing is successful (block 470—Yes), process 400 may include establishing wireless communication with the user device (block 480). For example, call transfer device 250 may establish a wireless communication by determining that pairing between call transfer device 250 and user device 230 was successful. Call transfer device 250 may present the feature set assumed from call reception device 270 when pairing with user device 230. In some implementations, call transfer device 250 may receive a notification (e.g., a message on a display of call transfer device 250, an audible alert, etc.) that the pairing was successful. In some implementations, call transfer device 250 may bond with user device 230.

Additionally, or alternatively, call transfer device 250 may present the feature set assumed from call reception device 270 when connecting and/or communicating wirelessly with user device 230. Additionally, or alternatively, call transfer device 250 may utilize the wireless communication protocol information, received from call reception device 270, when connecting and/or communicating wirelessly with user device 230.

Additionally, or alternatively, call transfer device 250 may search for services (e.g., files, contact details, calendar appointments, reminders, etc.), provided by user device 230, using a search-related protocol (e.g., Service Discovery Protocol or SDP). Additionally, or alternatively, call transfer device 250 may create a communication channel using the wireless communication protocol for sending and/or receiving data, with user device 230, during the wireless communication.

As further shown in FIG. 4B, process 400 may include obtaining path conditions for establishing a call path for voice calls (block 485). For example, call transfer device 250 may receive path conditions for establishing a call path for voice calls received by call transfer device 250, user device 230 (and forwarded to call transfer device 250), and/or another device. Call transfer device 250 may include a modem for receiving voice calls. Call transfer device 250 may also have access to voicemail system associated with call transfer device 250 and/or user device 230.

Additionally, or alternatively, call transfer device 250 may receive path conditions for establishing a call path to relay packets associated with a voice call, received by call transfer device 250, user device 230, and/or another device to a speaker included in call transfer device 250. Additionally, or alternatively, call transfer device 250 may receive path conditions for establishing a call path to relay packets, associated with a voice call, received by call transfer device 250, user device 230, and/or another device to call reception device 270.

Additionally, or alternatively, call transfer device 250 may receive path conditions for establishing a call path to relay packets, associated with a voice call, received by call transfer device 250, user device 230, and/or another device to a voicemail system associated with user device 230, and/or call transfer device 250.

In some implementations, call transfer device 250 may establish the call path for the voice calls received at call transfer device 250, user device 230, and/or another device, based on call information (e.g., a name, an alias, a telephone number, a network address of a caller device 210, a time when a voice call is received, etc.) associated with the voice call. Call transfer device 250 may obtain the call information as part of a synchronization process that occurs between call transfer device 250 and user device 230, call reception device 270, and/or another device, while selecting one or more devices for the wireless communication (blocks 420 and 460). In some implementations, call transfer device 250 may obtain the call information as part of a packet associated with the voice call. Additionally, or alternatively, call transfer device 250 may store the call information in a memory device (not shown) or a collection of memory devices accessible by call transfer device 250.

Additionally, or alternatively, call transfer device 250 may determine the call path based on path conditions associated with the call information (e.g., voice calls received from devices and callers included on a VIP list, associated with call transfer device 250, user device 230, and/or another device, are relayed to call reception device 270; voice calls received from devices and/or callers included on a Contacts list, associated with call transfer device 250, user device 230, and/or another device, are relayed to call reception device 270; any calls received from a device and/or a caller not included on the VIP list or the Contacts list are relayed to the voicemail system associated with call transfer device 250, user device 230, and/or another device; voice calls received between 12:00 PM and 4 PM are relayed to the voicemail system associated with call transfer device 250, user device 230, and/or another device; etc.).

In some implementations, call transfer device 250 may receive the path conditions associated with the call information as part of the synchronization process that occurs between call transfer device 250 and user device 230 and/or call transfer device 250 and call reception device 270, while selecting one or more devices for the wireless communication (blocks 420 and 460). In some implementations, call transfer device 250 may obtain the path conditions associated with the call information as part of a packet associated with the voice call. For example, the packet may include a flag (a flag=private, a flag=public, a flag=1, a flag=0, etc.), in a header for the packet, establishing the call path (e.g., a private flag indicates that the call path is to call reception device 270; a public flag indicates that the call path is to the speaker included in call transfer device 250; a flag='1' indicates that the call path is to the voicemail system associated with user device 230; a flag='0' indicates that the call path is to call reception device 270; etc.). In some implementations, the user of call transfer device 250 may provide the path conditions associated with the call information.

In some implementations, call transfer device 250 may automatically generate the path conditions associated with the call information, based on a call path selection history. The call path selection history may include historical data associated with the call paths (e.g., the speaker, the call reception device 270, the voicemail system associated with user device 230 and/or call transfer device 250, etc.) selected for the voice call, and the call information associated with the voice call over a period of time (e.g., one month, two months, three months, etc.).

The call path selection history may identify specific preferences of the user of call transfer device 250, when selecting the call path (e.g., the user selects all voice calls received between 12:00 PM and 4 PM to be relayed to the speaker; the user selects a greater quantity of voice calls from 'Mom' to be relayed to call reception device 270; the user selects all calls, received from telephone numbers not included on the Contacts list, associated with either user device 230 and/or call transfer device 250, to be relayed to the speaker; etc.) over a period of time (e.g., one month, two months, three months, etc.).

Call transfer device 250 may automatically generate path conditions for establishing the call path based on the specific preferences identified by the call path selection history (e.g., automatically generating a path condition establishing the call path to relay voice calls received between 12:00 PM and 4 PM to the speaker; automatically generating a path condition establishing the call path to relay voice calls from 'Mom' to call reception device 270; automatically generating a path condition establishing the call path to relay calls, received from telephone numbers not included on the Contacts list, associated with either user device 230 and/or call transfer device 250, to the speaker; etc.).

Additionally, or alternatively, call transfer device 250 may store the path conditions associated with the call information in a memory device (not shown) or a collection of memory devices accessible by call transfer device 250.

In some implementations, call transfer device 250 may determine default conditions for establishing the call path for the voice calls, where the call information for the voice call does not match the stored call information (e.g., establishing the call path to relay voice calls, where the call information associated with the voice calls does not match the stored call information, to the voicemail system associated with user device 230, call transfer device 250, and/or another device, terminate the voice call, etc.). Additionally, or alternatively, call transfer device 250 may store the default conditions associated with the call information in a memory device (not shown) or a collection of memory devices accessible by call transfer device 250.

In some implementations, call transfer device 250 may determine path conditions establishing priority for processing voice calls if two or more voice calls are received simultaneously (e.g., receiving concurrent rings at call transfer device 250 and user device 230). For example, call transfer device 250 and/or user device 230 may receive voice calls simultaneously. Call transfer device 250 may determine path conditions establishing priority based on various factors (e.g., the device closest in distance to call reception device 270 receives priority, the voice calls received by user device 230 receive priority, the voice calls received by call transfer device 250 receive priority, etc.).

In some implementations, call transfer device 250 may enable the user of call transfer device 250 to establish the priority for processing voice calls if two or more voice calls are received simultaneously. Additionally, or alternatively, call transfer device 250 may store the path conditions establishing priority for processing voice calls in a memory device (not shown) or a collection of memory devices accessible by call transfer device 250.

Although FIGS. 4A-4B show example blocks of process 400, in some implementations, process 400 may include additional blocks, fewer blocks, different blocks, or differently arranged blocks than those depicted in FIGS. 4A-4B. Additionally, or alternatively, two or more of the blocks of process 400 may be performed in parallel.

Figure 5:
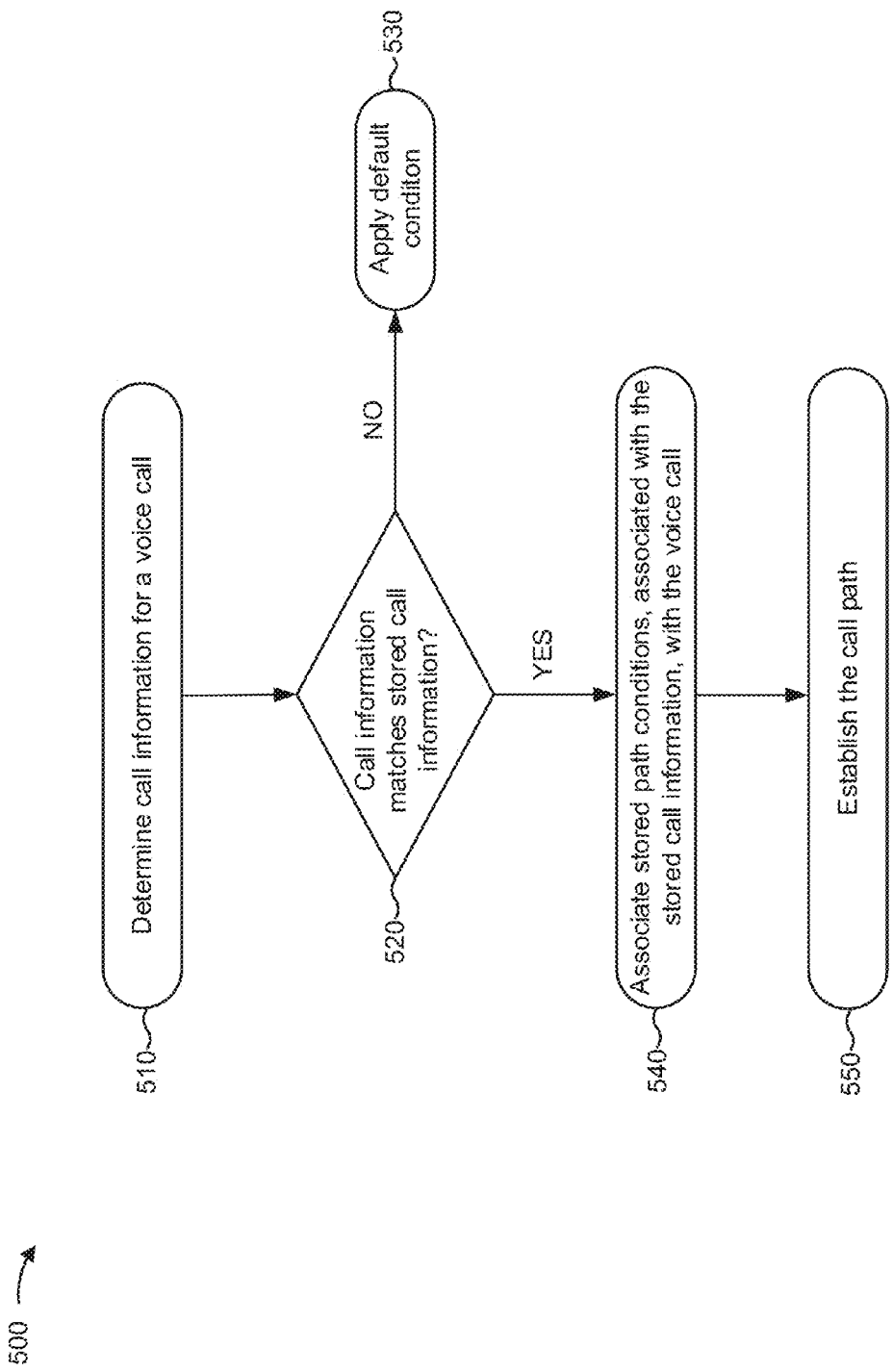
FIG. 5 is a flow chart of an example process for using an alternate call path using short-range wireless technology.

FIG. 5 is a flow chart of an example process 500 for using an alternate call path using short-range wireless technology. In some implementations, one or more process blocks of FIG. 5 may be performed by call transfer device 250. In some implementations, one or more process blocks of FIG. 5 may be performed by another device or a set of devices separate from or including call transfer device 250, such as user device 230 and/or call reception device 270.

As shown in FIG. 5, process 500 may include determining call information for a voice call (block 510). For example, call transfer device 250 may receive a voice call, received at user device 230 and forwarded to call transfer device 250, via WPAN-A 240. Additionally, or alternatively, call transfer device 250 may buffer packets, associated with the voice call, to adjust for delays in sending and/or receiving the packets for the voice call, based on synchronization issues of call data, included in the packets, between user device 230 and call reception device 250.

In some implementations, call transfer device 250 receive packets for the voice call transcoded (e.g., transcoded from narrow bandwidth to wide bandwidth, using Voice over LTE or VoLTE). Additionally, or alternatively, call transfer device 250 may encode and/or decode packets associated with the voice call to adjust for bandwidth requirements before relaying the packets to call reception device 270 to adjust for bandwidth limitations. In some implementations, call transfer device 250 may relay the packets for the voice call to call reception device 270 without decoding and/or re-encoding the packets.

Additionally, or alternatively, call transfer device 250 may receive a voice call, received by call transfer device 250 and/or another device. Additionally, or alternatively, call transfer device 250 may receive call information (e.g., a name, an alias, a telephone number, a network address of a caller device, a time when a voice call is received, etc.), associated with the voice call received at user device 230, call transfer device 250, and/or another device. In some implementations, the call information may be included in a packet associated with the voice call and received by user device 230 and/or call transfer device 250. Additionally, or alternatively, call transfer device 250 may determine the call information for the voice call by reading and/or parsing the packet.

As further shown in FIG. 5, process 500 may include determining whether the call information matches stored call information (block 520). For example, call transfer device 250 may compare the call information (e.g., received by call transfer device 250), associated with the voice call, with stored call information. If the call information matches the stored call information, then call transfer device 250 may associate a path condition for establishing a call path, associated with the stored call information, with the voice call. If the call information does not match the stored call information, then call transfer device 250 may not associate the path condition for establishing the call path, with the voice call.

As further shown in FIG. 5, if the call information does not match the stored call information (block 520—No), process 500 may include applying a default condition (block 530). For example, if call transfer device 250 determines that the call information does not the match stored call information, then call transfer device 250 may apply a default condition, previously stored for establishing a call path when the call information does not match the stored call information (e.g., when the call information does not match stored call information, establish the call path to redirect the voice call to a voicemail system associated with user device 230 and/or call transfer device 250; when the call information does not match stored call information, establish the call path to redirect the voice call to a speaker included in call transfer device 250, etc.).

In some implementations, if the call information does not match the stored call information, call transfer device 250 may enable a user of call transfer device 250 to select the call path for the voice call using a user input mechanism, provided on a user interface of call transfer device 250, included in call transfer device 250. In some implementations, if the call information does not match the stored call information, call transfer device 250 may not establish any call path and may terminate the voice call.

In some implementations, if the call information does not match the stored call information, call transfer device 250 may establish the call path based on a setting for call transfer device 250, user device 230, and/or another device (e.g., establishing the call path to call reception device 270 when the setting for call transfer device 250 is set to 'silent;' establishing the call path to call reception device 270 when the setting for call transfer device 250 is set to 'vibrate;' establishing the call path to call reception device 270 when the setting for user device 230 is set to 'silent;' establishing the call path to call reception device 270 when the setting for user device 230 is set to 'vibrate;' establishing the call path to a speaker, included in call transfer device 250, when the setting for call transfer device 250 is set to 'normal;' establishing the call path to call reception device 270 when the setting for call transfer device 250 is set to 'normal;' etc.).

As further shown in FIG. 5, if the call information matches the stored call information (block 520—Yes), process 500 may include associating the stored path conditions, associated with the stored call information, with the voice call (block 540). For example, if call transfer device 250 determines that the call information matches the stored call information, then call transfer device 250 may associate the stored path conditions, associated with the stored call information, with the voice call (e.g., associating a stored path condition, establishing a call path to the speaker for calls received between 12:00 PM and 4:00 PM, with the voice call, where the voice call was received at 2:00 PM; associating a stored path condition, establishing a call path to call reception device 270 for calls received from a caller, listed as 'Mom' on a Contacts list associated with call transfer device 250, with a voice call, where the voice call was from a caller with an alias 'Mom'; associating a stored path condition, establishing a call path to call reception device 270 for calls received from a caller, included a Contacts list associated with user device 230, with a voice call, where the voice call was from a caller included on the Contacts list; etc.).

In some implementations, if the call information matches the stored call information, call transfer device 250 may enable the user of call transfer device 250 to establish the call path for the voice call using the user input mechanism, provided on the user interface of call transfer device 250, included in call transfer device 250, overriding any path conditions associated with the call information.

As further shown in FIG. 5, process 500 may include establishing the call path (block 550). For example, call transfer device 250 may establish the call path, based on the path conditions associated with the voice call (e.g., establishing the call path to the speaker, included in call transfer device 250, for the voice call received at 2:00 PM, where the path condition associated with the voice call, established the call path to the speaker for calls received between 12:00 PM and 4:00 PM; establishing the call path to call reception device 270, for the voice calls received from the caller with the alias 'Mom,' where the path condition associated with the voice call, established the call path to call reception device 270 for all calls received from a caller, included on the Contacts list; etc.).

In some implementations, call transfer device 250 may establish the call path based on a setting for call transfer device 250, user device 230, and/or another device (e.g., establishing the call path to call reception device 270 when the setting for call transfer device 250 is set to 'silent;' establishing the call path to call reception device 270 when the setting for call transfer device 250 is set to 'vibrate;' establishing the call path to call reception device 270 when the setting for user device 230 is set to 'silent;' establishing the call path to call reception device 270 when the setting for user device 230 is set to 'vibrate;' establishing the call path to a speaker, included in call transfer device 250, when the setting for call transfer device 250 is set to 'normal;' establishing the call path to call reception device 270 when the setting for call transfer device 250 is set to 'normal;' etc.). Additionally, or alternatively, call transfer device 250 may output the voice call via the established call path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
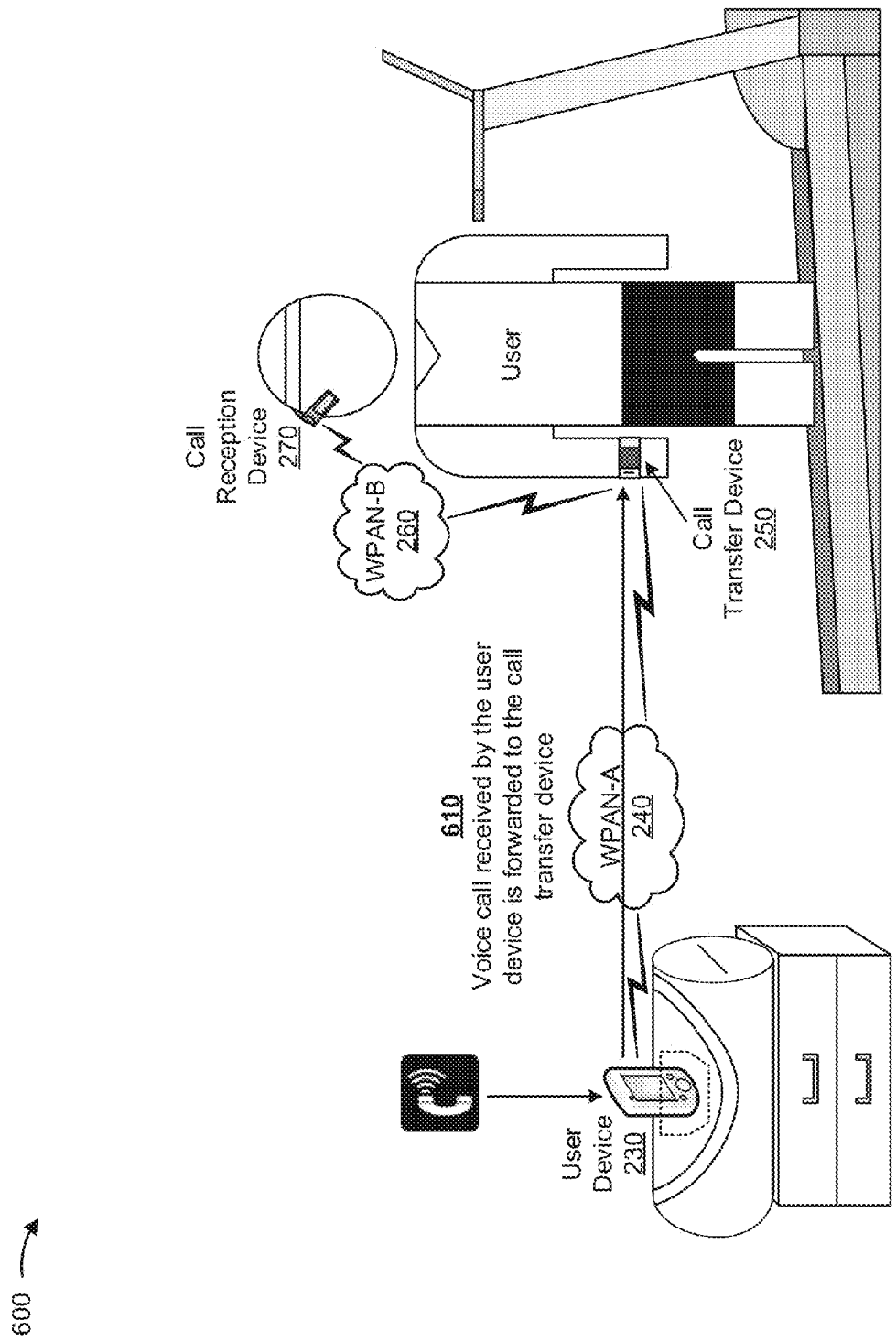
FIGS. 6A-6C are diagrams of an example implementation relating to the example processes shown in FIGS. 4A, 4B, and 5.
Figure 6B:
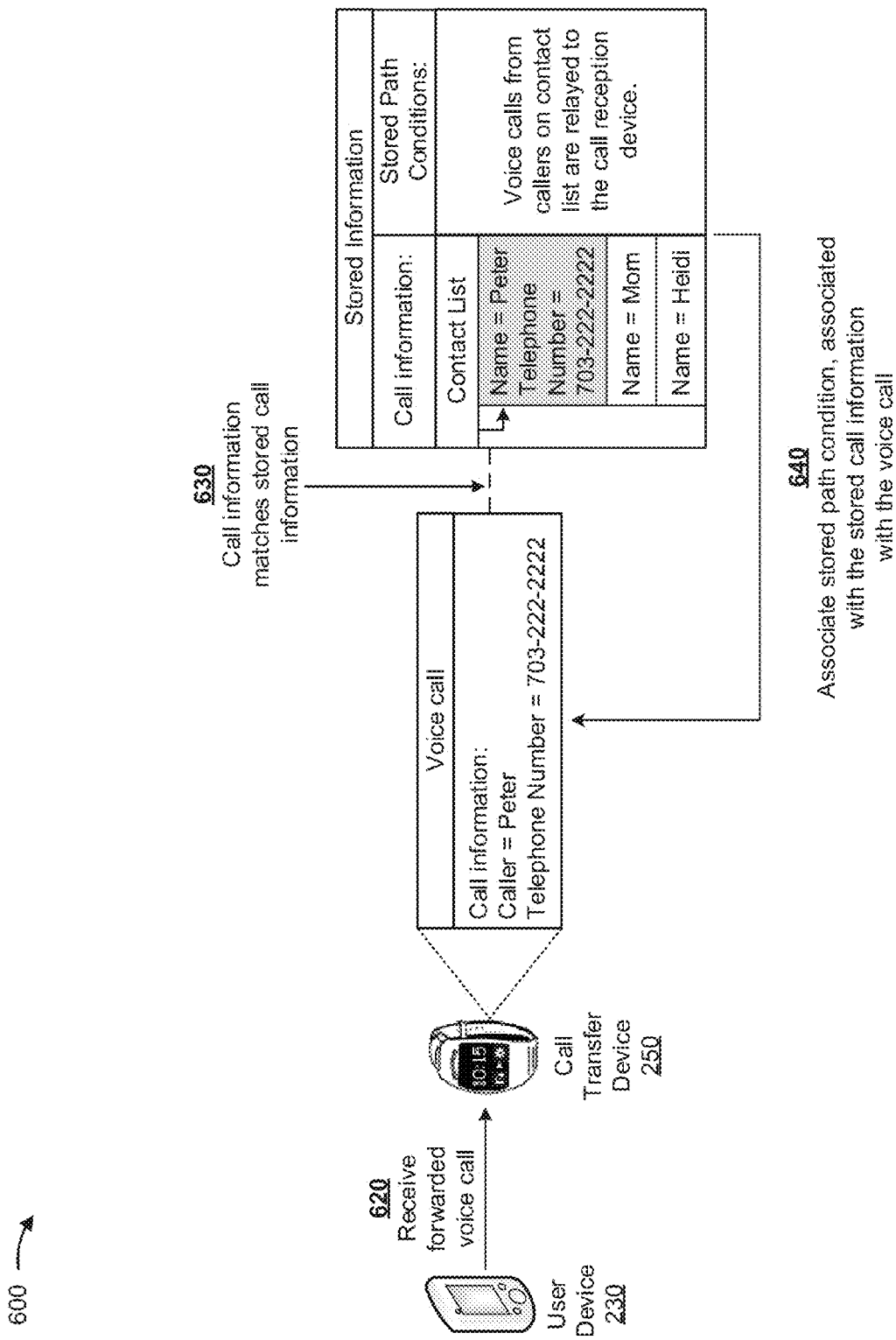
Figure 6C:
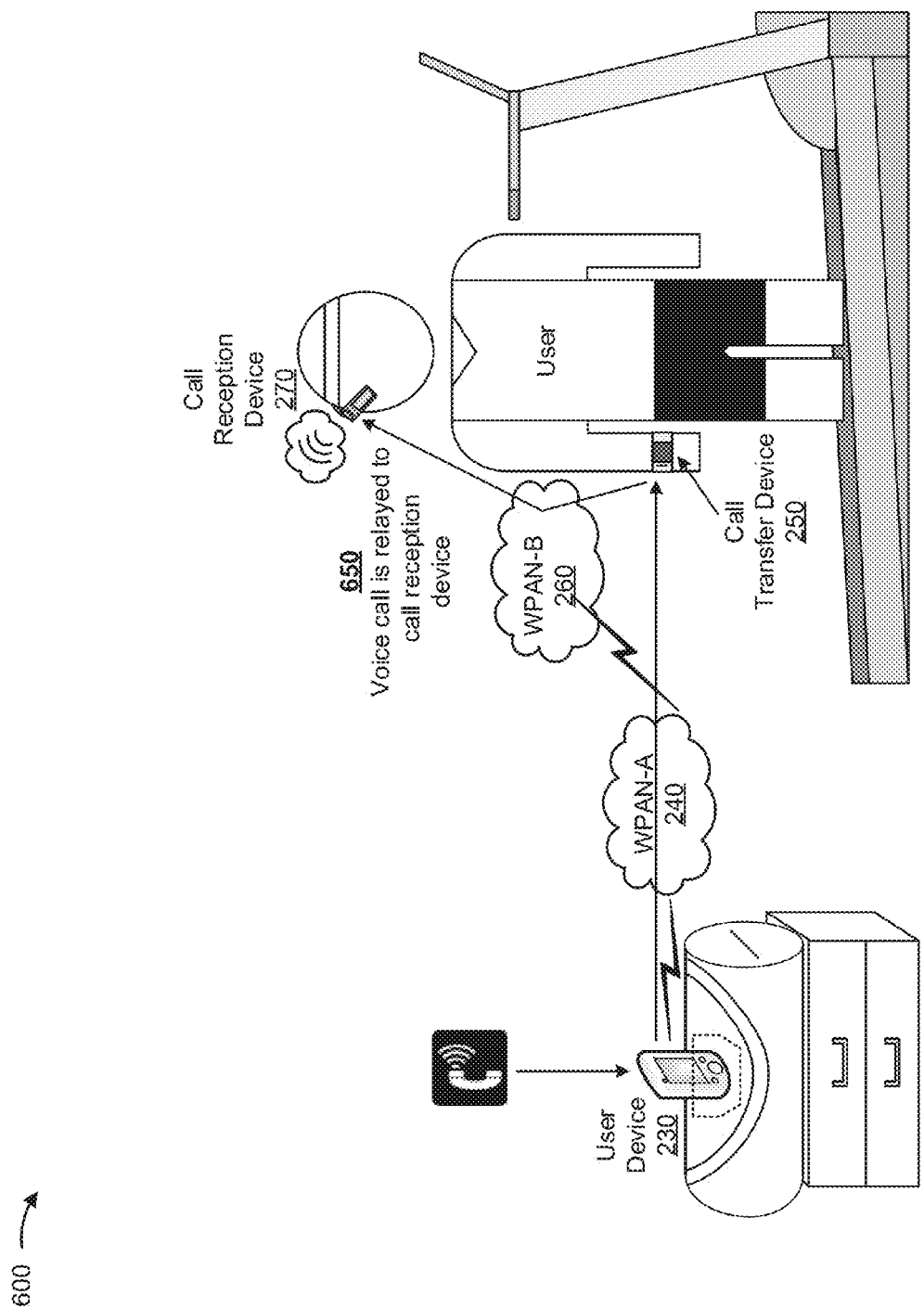

FIGS. 6A-6C are diagrams of an example implementation relating to the example processes shown in FIGS. 4A, 4B, and 5. FIGS. 6A-6C show an example of implementing a system for establishing an alternate call path using short-range wireless technology.

As shown in FIG. 6A, assume a user is performing an activity (e.g., jogging on a treadmill), wearing a call transfer device (e.g. call transfer device 250) and a call reception device (e.g., call reception device 270) in a public place (e.g., a gymnasium). Assume the user enabled short-range wireless communication between call transfer device 250 and call reception device 270, using short-range wireless communication technology (e.g., Bluetooth technology) via a wireless personal area network (e.g., WPAN-B 260). Assume further that the user has a mobile device (e.g., user device 230) that is a distance away (e.g., 3 meters).

Assume the user enabled a second short-range wireless communication between call transfer device 250 and user device 230, using Bluetooth technology via a second wireless personal area network (e.g., WPAN-A 240). Assume the user finds interacting with user device 230 inconvenient while jogging and uses call transfer device 250 as the user's primary device for managing voice calls. Assume call transfer device 250 has a modem and that both call transfer device 250 and user device 230 may send and/or receive voice calls. Assume call transfer device 250 has stored path conditions associated with call information for voice calls. As shown by FIG. 6A, and by reference number 610, call transfer device 250 receives a voice call, received at user device 230 and forwarded to call transfer device 250, via WPAN-A 240.

As shown in FIG. 6B, assume call transfer device 250 has a stored path condition that establishes a call path to call reception device 270 for voice calls with associated call information, including a name included on a Contacts list and stored on either user device 230 and/or call transfer device 250. As shown in FIG. 6B, and by reference number 620, call transfer device 250 receives the voice call, that was forwarded from user device 230, and determines call information associated with the voice call (e.g. determines that the call information indicates that the voice call is from telephone number=703-222-2222).

As shown in FIG. 6B, and by reference number 630, call transfer device 250 compares the call information, associated with the received voice call, with the stored call information and determines that the call information, associated with the received voice call, matches the stored call information (e.g., the call information indicating that the telephone number=703-222-2222 matches the stored call information, which includes the telephone number=703-222-2222 associated with a name Peter included on a Contact list associated with user device 230). As shown in FIG. 6B, and by reference number 640, call transfer device 250 associates a stored path condition, associated with the stored call information, with the voice call (e.g., associates the stored path condition, establishing the call path to call reception device 270 for voice calls from callers whose names are included on the Contacts list, associated with either user device 230 and/or call transfer device 250).

As shown in FIG. 6C, and by reference number 650, call transfer device 250 establishes the call path to call reception device 270 with the voice call. As shown in FIG. 6C, and by reference number 660, call transfer device 250 allows the user to use call reception device 270 to speak with the caller while maintaining privacy, provided by call reception device 270, while promoting mobility for the user.

As indicated above, FIGS. 6A-6C are provided merely as an example. Other examples are possible and may differ from what was described with regard to FIGS. 6A-6C.

Implementations described herein establish an alternate call path, for a call transfer device, using short-range wireless technology. The call transfer device may establish an alternate call path to relay packets, associated with a voice call received at a user device, to a call reception device. The call transfer device may also establish a call path to relay packets, associated with a voice call received at the call transfer device, to the call reception device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
establish a first communication with a first communication device using short-range wireless communication technology;
establish a second communication with a second communication device using short-range wireless communication technology;
receive information identifying path conditions during a synchronization process between the device and the first communication device or between the device and the second communication device;
receive a voice call from the second communication device;
determine call information associated with the voice call;
compare the call information with stored call information;
associate a path condition, of the path conditions and previously associated with the stored call information, with the voice call if the call information matches the stored call information; and
selectively establish, based on the path condition, a call path to a speaker associated with the device or to the first communication device.

2. The device of claim 1,
where the device is a wearable device,
where the first communication device is a headset, and
where the second communication device is a user device.

3. The device of claim 1, where the one or more processors are further to:
output the voice call based on a default condition if the call information does not match the stored call information.

4. The device of claim 3, where the default condition is based on a setting for the device, the first communication device, or the second communication device.

5. The device of claim 1, where the path condition is based on a setting for the device, the first communication device, or the second communication device.

6. The device of claim 1,
where the voice call is a first voice call, and
where the one or more processors are further to:
receive a second voice call at the device at a same time as the first voice call is received; and
determine a priority for processing the first voice call and the second voice call based on the path condition.

7. The device of claim 6, where the one or more processors are further to:
output the first voice call and the second voice call based on the determined priority.

8. A non-transitory computer-readable medium storing instructions, the instructions comprising:
one or more instructions that, when executed by one or more processors of a device, cause the one or more processors to:
establish a first communication with a first communication device using short-range wireless communication technology;
establish a second communication with a second communication device using short-range wireless communication technology;
receive information identifying a path condition during a synchronization process between the device and the first communication device or between the device and the second communication device;
receive a voice call from the second communication device;
determine call information associated with the voice call;
associate the path condition with the voice call based on the call information;
selectively establish, based on the path condition, a call path to a speaker associated with the device or to the first communication device; and
output the voice call via the established call path.

9. The non-transitory computer-readable medium of claim 8, where the information identifying the path condition is included in a header for a packet associated with the voice call.

10. The non-transitory computer-readable medium of claim 8, where the short-range wireless communication technology is Bluetooth technology, Z-Ware technology, ZigBee technology, or Body Area Network technology.

11. The non-transitory computer-readable medium of claim 8, where the one or more instructions, that when executed by the one or more processors, further cause the one or more processors to:
generate another path condition based on call paths selected for a plurality of voice calls.

12. The non-transitory computer-readable medium of claim 8, where the one or more instructions, that when executed by the one or more processors, further cause the one or more processors to:
  encode and/or decode packets associated with the voice call before outputting the voice call.

13. A method comprising:
  establishing, by a device, a first communication with a first communication device using short-range wireless communication technology;
  establishing, by the device, a second communication with a second communication device using short-range wireless communication technology;
  receiving, by the device, information identifying a path condition during a synchronization process between the device and the first communication device or between the device and the second communication device;
  receiving, by the device, a voice call;
  determining, by the device, call information associated with the voice call;
  comparing, by the device, the call information with stored call information;
  associating, by the device, the path condition, previously associated with the stored call information, with the voice call if the call information matches the stored call information; and
  selectively establishing, by the device and based on the path condition, a call path to a speaker associated with the device, to the first communication device, or to a voicemail system associated with the second communication device.

14. The method of claim 13, further comprising:
  buffering packets associated with the voice call to adjust synchronization of call data, included in the packets, between the device and the first communication device or between the device and the second communication device.

15. The method of claim 13, further comprising:
  determining the path condition without input from a user of at least one of the device or the second communication device.

16. The method of claim 13, where the voice call is received by the first communication device and forwarded to the device.

17. The method of claim 13, where the information identifying the path condition is included in a header for a packet associated with the voice call.

18. The method of claim 13, where the short-range wireless communication technology is Bluetooth technology, Z-Ware technology, ZigBee technology, or Body Area Network technology.

19. The method of claim 13, where the device is a wearable device.

20. The non-transitory computer-readable medium of claim 8, where the one or more instructions to output the voice call comprise:
  one or more instructions that, when executed by the one or more processors, cause the one or more processors to:
    encode packets associated with the voice call to adjust for bandwidth requirements, and
    relaying the packets to the first communication device.

* * * * *